US011111174B2

(12) United States Patent
Xu et al.

(10) Patent No.: US 11,111,174 B2
(45) Date of Patent: Sep. 7, 2021

(54) MINERAL FIBER ROOF COVER BOARDS (71) Applicant: UNITED STATES GYPSUM COMPANY, Chicago, IL (US)

(72) Inventors: Wei Xu, Vernon Hills, IL (US); Derrick Hutchinson, Mundelein, IL (US); Christopher J. Rokke, Saginaw, MN (US); Lori Tuttle, Orland Park, IL (US); Michael J. Hough, Beach Park, IL (US)

(73) Assignee: UNITED STATES GYPSUM COMPANY, Chicago, IL (US)

(*) Notice: Subject to any disclaimer, the term of this patent is extended or adjusted under 35 U.S.C. 154(b) by 357 days.

(21) Appl. No.: 15/988,974

(22) Filed: May 24, 2018

(65) Prior Publication Data

US 2019/0077700 A1    Mar. 14, 2019

Related U.S. Application Data (60) Provisional application No. 62/557,863, filed on Sep. 13, 2017.

(51) Int. Cl.
*C03C 14/00* (2006.01)
*C03C 25/47* (2018.01)
(Continued)

(52) U.S. Cl.
CPC ............ *C03C 14/002* (2013.01); *B32B 5/022* (2013.01); *B32B 19/04* (2013.01); *B32B 19/06* (2013.01);
(Continued)

(58) Field of Classification Search
USPC ...... 442/180; 428/189, 196, 218, 41.3, 41.5, 428/292.1, 341, 468; 52/746.11, 745.06,
(Continued)

(56) References Cited

U.S. PATENT DOCUMENTS 2,634,207 A    4/1953  Miscall et al.
3,244,632 A    4/1966  Schulz et al.
(Continued)

FOREIGN PATENT DOCUMENTS

CA    1232734 A    2/1988
EP    0347810 A2   12/1989
(Continued)

OTHER PUBLICATIONS

Technical Information Sheet, 911, Firestone Building Products, CoverDeck™, S723-RFS-200, Apr. 18, 2008.
(Continued)

*Primary Examiner* — Lynda Salvatore
(74) *Attorney, Agent, or Firm* — Vorys, Sater, Seymour and Pease LLP; Pradip Sahu; Philip T. Petti (57) ABSTRACT

Composite roofing structures can include mineral fiber roof cover boards with high concentration of mineral wool or mineral wool and perlite. The roofing structure may include: a roof cover board including a dried base mat including: 8-25% mineral wool, 40-65% perlite, 9-15% binder, 9-15% cellulosic fiber, and 0.25-2% sizing agent, all % by weight; an insulation layer; and a roofing membrane. The roof cover board is over the insulation layer, the roofing membrane is over the roof cover board. The roof cover board is attached to the insulation layer. The roofing membrane is attached to the roof cover board. Alternatively dried base mat may include: 30-70% mineral wool, 10-50% perlite, 5-15% binder, 2-20% cellulosic fiber, and 0.25-2% sizing agent. Alternatively the dried base mat may include: 60-90% mineral wool, 0-10% fiber, 0-10% perlite, 4-10% binder, 0-5% gypsum, and 0.25-2% sizing agent.

20 Claims, 4 Drawing Sheets

(51) Int. Cl.
| | |
|---|---|
| *B32B 19/04* | (2006.01) |
| *B32B 19/06* | (2006.01) |
| *B32B 5/02* | (2006.01) |
| *E04D 11/02* | (2006.01) |
| *C03C 25/26* | (2018.01) |
| *E04D 13/16* | (2006.01) |
| *C04B 26/28* | (2006.01) |
| *C03C 25/321* | (2018.01) |
| *D21J 1/16* | (2006.01) |
| *C04B 26/02* | (2006.01) |
| *C04B 111/00* | (2006.01) |

(52) U.S. Cl.
CPC .......... *C03C 25/26* (2013.01); *C03C 25/321* (2013.01); *C03C 25/47* (2018.01); *C04B 26/02* (2013.01); *C04B 26/28* (2013.01); *D21J 1/165* (2013.01); *E04D 11/02* (2013.01); *E04D 13/1643* (2013.01); *B32B 2255/02* (2013.01); *B32B 2255/24* (2013.01); *B32B 2262/062* (2013.01); *B32B 2262/101* (2013.01); *B32B 2307/102* (2013.01); *B32B 2307/3065* (2013.01); *B32B 2419/06* (2013.01); *C03C 2214/02* (2013.01); *C04B 2111/00586* (2013.01); *C04B 2111/00612* (2013.01); *C04B 2201/20* (2013.01)

(58) Field of Classification Search
USPC ............... 52/412, 309.1; 162/145, 171, 175
See application file for complete search history.

(56) References Cited

U.S. PATENT DOCUMENTS

| | | | |
|---|---|---|---|
| 3,623,938 A | 11/1971 | Jenkins | |
| 3,952,830 A | 4/1976 | Oshida et al. | |
| 3,988,199 A | 10/1976 | Hillmer et al. | |
| 4,126,512 A * | 11/1978 | Hill | C04B 26/285 162/145 |
| 4,153,503 A | 5/1979 | Booth et al. | |
| 4,184,914 A | 1/1980 | Jenkins | |
| 4,710,422 A | 12/1987 | Fredenucci | |
| 4,904,510 A | 2/1990 | Nath et al. | |
| 4,963,603 A | 10/1990 | Felegi, Jr. et al. | |
| 5,011,741 A | 4/1991 | Hoffman | |
| 5,071,511 A | 12/1991 | Pittman | |
| 5,134,179 A | 7/1992 | Felegi, Jr. et al. | |
| 5,277,762 A | 1/1994 | Felegi, Jr. et al. | |
| 5,527,430 A | 6/1996 | Gill | |
| 5,539,028 A | 7/1996 | Bednar et al. | |
| 5,685,815 A | 11/1997 | Bottorff et al. | |
| 5,717,012 A * | 2/1998 | Bondoc | B32B 5/18 524/13 |
| 5,749,954 A | 5/1998 | Law et al. | |
| 5,766,417 A | 6/1998 | Brungardt | |
| 5,911,818 A | 6/1999 | Baig | |
| 6,007,906 A | 12/1999 | Bottorff et al. | |
| 6,033,526 A | 3/2000 | Ehrhardt et al. | |
| 6,126,783 A | 10/2000 | Gill | |
| 6,149,831 A | 11/2000 | Deporter et al. | |
| 6,165,321 A | 12/2000 | Pauley et al. | |
| 6,228,219 B1 | 5/2001 | Ehrhardt et al. | |
| 6,273,997 B1 | 8/2001 | Ehrhardt et al. | |
| 6,299,970 B1 | 10/2001 | Richards et al. | |
| 6,316,095 B1 | 11/2001 | Black et al. | |
| 6,512,146 B2 | 1/2003 | Pauley et al. | |
| 6,586,520 B1 | 7/2003 | Canorro et al. | |
| 6,595,632 B1 | 7/2003 | Storfer-Isser et al. | |
| 6,616,804 B2 | 9/2003 | Foster et al. | |
| 6,919,132 B2 | 7/2005 | Felegi, Jr. et al. | |
| 7,189,308 B2 | 3/2007 | Feit et al. | |
| 7,879,433 B1 | 2/2011 | Felegi, Jr. et al. | |
| 7,972,688 B2 | 7/2011 | Letts et al. | |
| 8,133,354 B2 | 3/2012 | Baig | |
| 9,243,401 B2 | 1/2016 | Kragness et al. | |
| 2003/0060113 A1 | 3/2003 | Christie et al. | |
| 2003/0134556 A1 | 7/2003 | Christie et al. | |
| 2004/0172899 A1 | 9/2004 | Paradise et al. | |
| 2007/0207304 A1 | 9/2007 | Krick et al. | |
| 2013/0216762 A1 | 8/2013 | Chan et al. | |
| 2014/0272402 A1 | 9/2014 | Dubey et al. | |
| 2015/0040503 A1* | 2/2015 | Tackett | E04D 11/02 52/309.4 |
| 2015/0152262 A1* | 6/2015 | Gudik-Sorensen | D04H 1/64 524/607 |
| 2015/0354220 A1 | 12/2015 | Nandi et al. | |
| 2016/0053078 A1 | 2/2016 | Dubey et al. | |
| 2016/0138264 A1 | 5/2016 | Kragness et al. | |
| 2017/0107152 A1 | 4/2017 | Xu et al. | |
| 2017/0114211 A1 | 4/2017 | Kumar et al. | |

FOREIGN PATENT DOCUMENTS

| | | |
|---|---|---|
| GB | 2084624 A | 4/1982 |
| WO | 03012220 A1 | 2/2003 |
| WO | 2012010694 A1 | 1/2012 |
| WO | 2012158354 A1 | 11/2012 |
| WO | 2017066065 A1 | 4/2017 |
| WO | 2017218756 A1 | 12/2017 |

OTHER PUBLICATIONS

Marketing Bulletin, Firestone Building Products Company,CoverDeck Firestone-Engineered Cover Board, Jul. 2006.
Safety Data Sheet, Section 1. Chemical Product and Company Identification, Emulsion 8162, Bercen, pp. 1-6, Jan. 19, 2016.
Bercen, Inc., Emulsion 8162, Technical Data Sheet, Aug. 27, 2009.
The Importance of Cover Boards in Roofing Assemblies, Derrick Hutchinson, USG Roofing Solutions, 2017.
Rockwool: "Safety Data Sheet", Jan. 1, 2016, pp. 1/7-7/7, XP055566173, Retrieved from the Internet: URL: http://www.ais-group.com.au/images/files/rockwool_sds_Amd-11-curr.pdf [retrieved on Mar. 7, 2019] p. 1, table at bottom.
Rockwool: "Safety Data Sheet Rockwool Stone Wool Safety Data Sheet Rockwool Stone Wool", Nov. 26, 2013, pp. 1(3)-3(3), XP055566180, Retrieved from the Internet: URL:https://static.rockwool.com/globalassets/rockwool-se/teknisk-support/documentation/sakerhetsdatablad/rockwool-safety-data-sheet-20131126.pdf [retrieved on Mar. 7, 2019] p. 1, table under heading 3.
Bradford: "CSR Safe Use Information Sheet FBS-1 Rockwool Insulation Products", Dec. 6, 2016, pp. 1/6-6/6, XP055566183, Retrieved from the Internet: URL:https://www.bradfordinsulation.com.au/-/media/bradford/files/rockwool-suis.pdf [retrieved on Mar. 7, 2019] p. 2, table at top.
Rockwool: "Flat Roof Insulation High Compression Strength Insulation for Flat Roofs", Aug. 1, 2014, pp. 1/12-12/12, XP055566190, Retrieved from the Internet: URL:http://www.ais-group.com.au/images/products/Hardrock-60/flatroof-800-103_04-14_v3_lr.pdf [retrieved on Mar. 7, 2019] pp. 4-5.
International Search Report and Written Opinion dated Mar. 14, 2019 for PCT/US2018/050636 to United States Gypsum Company filed Sep. 12, 2018.

* cited by examiner

MINERAL FIBER ROOF COVER BOARDS

CROSS-REFERENCE TO RELATED APPLICATION

This claims the benefit of U.S. provisional patent application No. 62/557,863 filed Sep. 13, 2017, incorporated herein by reference.

FIELD OF THE INVENTION

The present disclosure relates to mineral fiber roof cover boards as well as composite roofing structures and methods of manufacture. Advantageously, the inventive roof cover boards have acoustical properties stemming from the high concentration of either mineral wool or mineral wool and perlite in combination, which in some instances is 90 wt % of the roof cover board composition. High concentrations of either mineral wool or mineral wool and perlite in combination enhance the fire retardant properties and acoustical properties of the roof cover boards of the present invention over traditional roof cover boards.

BACKGROUND OF ART

The roofing systems for commercial and industrial building roofs with low-slope roof decks typically include one or more layers of a low-density roofing insulation, a layer of roofing cover boards that overlie the low-density roofing insulation layer(s), and a waterproofing membrane that overlies the layer of cover boards. The layer(s) of low-density insulation, such as a low-density polymer-based foam insulation, if not protected, can be partially crushed or otherwise damaged from worker traffic over the insulation, the placement of heavy objects on the insulation, the weather, and other causes commonly encountered in roofing construction. The layer of roofing cover boards that overlies the one or more layers of low-density insulation, protects the more fragile low density insulation from damage, acts as a fire barrier, provides a suitable substrate for the attachment of the overlying waterproofing membrane, and augments the insulating function of the low-density insulation. The uppermost waterproofing membrane layer overlying the cover board layer protects the underlying cover board and insulation layers from moisture and other adverse climatic conditions. Normally, these three components (the low-density insulation boards, the roofing cover boards, and the waterproofing membrane) of the roofing system are separately manufactured and separately and successively applied to the low-slope roof deck.

Thus, roof cover board is typically used on top of roof insulation to provide a rigid, smooth top surface for the application of the membrane. It will protect the insulation from damages of foot traffic and give wind uplifting resistance and additional insulation to the roofing system. The application of cover board over mechanically attached insulation will also offer three other distinct advantages—(1) it reduces the shank length of the fastener, (2) it insulates the fastener/eliminating energy loss/possible thermal bridging at fasteners and insulation joints, and (3) it eliminates protrusions to the membrane surface from backed-out fasteners created by thermal contraction stress. The use of roof cover boards has become a standard method to enhance overall roof system performance for all low-slope roof systems.

Roof cover board currently on the market can be roughly divided into two categories: (1) premium roof cover board and (2) economical/entry level roof cover board.

Entry level roof boards are primarily limited to wood fiber boards and perlite boards. There is currently no gypsum fiber based light weight entry level roof cover board on the market.

Premium roof cover board provides an excellent substrate for all types of conventional low-slope roofing membranes, particularly in fully adhered assemblies. The material is durable and provides superior impact and puncture resistance. However, this kind of cover board is normally heavy and expensive. Entry level roof cover board, on the other hand, does not have the quality of premium roof cover board, but is light weight and more affordable. Many builders and contractors prefer to use entry level roof cover board over premium roof board because of these two advantages. This is especially true for re-roofing applications.

Premium roof cover board includes glass mat faced gypsum board (such as USG's glass mat faced SECUROCK and Georgia Pacific's DENSDECK products) and fiber reinforced gypsum (such as USG's gypsum-fiber SECUROCK).

U.S. Pat. Nos. 3,988,199, 4,126,512, 5,749,954, and 6,149,831 described formulations and manufacturing processes to make perlite boards. However, these formulations all have asphalt/bituminous material in them, either as internal additive or coating material to impart binding or water repellant properties to the perlite board. Asphalt is a highly combustible material and will significantly reduce the fire performance of the perlite board. In addition, Newsprint was used in the formulations to impart flexural strength. Newsprint (also known as "News") is normally made with mechanical pulp or semi-mechanical pulp which has stiff and short cellulose fibers. Post-consumer Newsprint also contained a significant amount of ink which will work as a filler to lower the strength of the perlite board. Lastly, the amounts of starch used in these formulations are less than 5% of the total weight of solid materials in the formulation. This will result in a perlite board which is relatively weaker.

Gypsum fiber products, such as USG's GF SECUROCK, could be considered a heavy weight material. It is made using gypsum and cellulose fibers.

U.S. Patent Application Publication Number 2017/0107152 describes gypsum fiber panels that are absent mineral wool and optionally includes stucco.

SUMMARY OF THE INVENTION

The present disclosure relates to mineral fiber roof cover boards as well as a method of manufacture. Advantageously, the inventive roof cover boards have acoustical properties stemming from the high combined concentration of either mineral wool or mineral wool and perlite in combination, which in some instances is 90 wt % of the roof cover board composition. High concentrations of either mineral wool or mineral wool and perlite in combination enhance the fire retardant properties and acoustical properties of the roof cover boards of the present invention over traditional roof cover boards.

An first exemplary composite roofing structure of the present invention comprises:

a roof cover board that comprises a dried base mat comprising:
  about 8 wt % to about 25 wt % mineral wool,
  about 40 wt % to about 65 wt % perlite,
  about 9 wt % to about 15 wt % binder, about 9 wt % to about 15 wt % cellulosic fiber, and
about 0.25 wt % to about 2 wt % sizing agent;
a layer of insulation; and
a layer of roofing membrane;
wherein the roof cover board is over the layer of insulation, the roofing membrane is over the roof cover board, the roof cover board is attached to the layer of insulation, and the roofing membrane is attached to the roof cover board.

The dried base mat of the roof cover boards of the present invention may have an absence of glass fibers, gypsum, wax emulsions, siloxanes, silicone fluids, glass beads, polymer fibers, clay, vermiculite, calcium carbonate, magnesium carbonate, and zinc pyrithione.

Typically the dried base mat of the roof cover board has a density of about 10 pcf to about 17 pcf (160 to 272 kg per cubic meter), for example, about 15 pcf to about 17 pcf (240 to 272 kg per cubic meter).

Preferably for the dried base mat of the roof cover board of this composite roofing structure:
the mineral wool is at about 8 wt % to about 20 wt %,
the perlite is at about 45 wt % to about 65 wt %,
the binder is at about 9.5 wt % to about 13 wt %,
the cellulosic fiber is at about 10 wt % to about 14.5 wt %, and
the sizing agent is at about 0.25 wt % to about 1 wt %; and
wherein the dried base mat of the roof cover board has a density of about 10 pcf to about 15 pcf (160 to 240 kg per cubic meter) and a thickness of about ¼ in to about ¾ in.

More preferably for the dried base mat of the roof cover board of this composite roofing structure:
the mineral wool is at about 15 wt % to about 20 wt %,
the perlite is at about 55 wt % to about 65 wt %,
the binder is at about 9.5 wt % to about 10.5 wt %,
the cellulosic fiber is at about 12 wt % to about 14 wt %, and
the sizing agent is at about 0.25 wt % to about 0.5 wt %;
wherein the dried base mat of the roof cover board has a density of about 11 pcf to about 14 pcf (176 to 224 kg per cubic meter) and a thickness of about ⅜ inch to about ⅝ inch.

An exemplary roof cover board may comprise:
a dried base mat that comprises:
about 8 wt % to about 25 wt % mineral wool;
about 40 wt % to about 65 wt % perlite;
about 9 wt % to about 15 wt % binder;
about 9 wt % to about 15 wt % cellulosic fiber; and
about 0.25 wt % to about 2 wt % sizing agent; and
an asphalt coating on a surface of the dried base mat.

A second exemplary composite roofing structure of the present invention comprises:
a roof cover board that comprises a dried base mat comprising:
about 30 wt % to about 70 wt % mineral wool,
about 10 wt % to about 50 wt % perlite,
about 5 wt % to about 15 wt % binder,
about 2 wt % to about 20 wt % cellulosic fiber, and
about 0.25 wt % to about 2 wt % sizing agent;
a layer of insulation; and
a layer of roofing membrane;
wherein the roof cover board is over the layer of insulation, the roofing membrane is over the roof cover board, the roof cover board is attached to the layer of insulation, and the roofing membrane is attached to the roof cover board.

Typically the dried base mat of the roof cover board has a density of about 10 pcf to about 17 pcf (160 to 272 kg per cubic meter), for example, about 15 pcf to about 17 pcf (240 to 272 kg per cubic meter).

Preferably for the dried base mat of the roof cover board of this composite roofing structure:
the mineral wool is at about 40 wt % to about 60 wt %,
the perlite is at about 20 wt % to about 40 wt %,
the binder is at about 5 wt % to about 10 wt %,
the cellulosic fiber is at about 8 wt % to about 15 wt %, and
the sizing agent is at about 0.25 wt % to about 1 wt %; and
wherein the dried base mat of the roof cover board has a density of about 10 pcf to about 15 pcf (160 to 240 kg per cubic meter) and a thickness of about ¼ in to about ¾ in.

More preferably for the dried base mat of the roof cover board of this composite roofing structure:
the mineral wool is at about 45 wt % to about 50 wt %,
the perlite is at about 30 wt % to about 35 wt %,
the binder is at about 6.5 wt % to about 8.5 wt %, and
the cellulosic fiber is at about 11 wt % to about 13 wt %, and
the sizing agent is at about 0.25 wt % to about 0.5 wt %; and
wherein the dried base mat of the roof cover board has a density of about 11 pcf to about 14 pcf (176 to 224 kg per cubic meter) and a thickness of about ⅜ inch to about ⅝ inch.

The dried base mat of the foregoing roof cover boards of this invention may have an absence of boron oxide, glass fibers, gypsum, wax emulsions, siloxanes, silicone fluids, glass beads, polymer fibers, clay, vermiculite, calcium carbonate, magnesium carbonate, and zinc pyrithione.

Another exemplary roof cover board comprises:
a dried base mat that comprises:
about 30 wt % to about 70 wt % mineral wool;
about 10 wt % to about 50 wt % perlite;
about 5 wt % to about 15 wt % binder;
about 2 wt % to about 20 wt % cellulosic fiber; and
about 0.25 wt % to about 2 wt % sizing agent; and
an asphalt coating on a surface of the dried base mat.

Yet another exemplary composite roofing structure may comprise:
a roof cover board that comprises a dried base mat comprising:
about 60 wt % to about 90 wt % mineral wool,
0 wt % to about 10 wt % glass fiber,
0 wt % to about 10 wt % perlite,
about 4 wt % to about 10 wt % binder,
0 wt % to about 5 wt % gypsum, and
about 0.25 wt % to about 2 wt % sizing agent;
a layer of insulation; and
a layer of roofing membrane;
wherein the roof cover board is over the layer of insulation, the roofing membrane is over the roof cover board, the roof cover board is attached to the layer of insulation, and the roofing membrane is attached to the roof cover board.

The dried base mat of the foregoing roof cover board may have an absence of boron trioxide, cellulosic fibers, wax emulsions, siloxanes, silicone fluids, glass beads, polymer fibers, clay, vermiculite, calcium carbonate, magnesium carbonate, and zinc pyrithione.

A third exemplary roof cover board of the present invention may comprise:
a dried base mat that comprises:
about 60 wt % to about 90 wt % mineral wool;
0 wt % to about 10 wt % glass fiber;
0 wt % to about 10 wt % perlite;

about 4 wt % to about 10 wt % binder;
0 wt % to about 5 wt % gypsum; and
about 0.25 wt % to about 2 wt % sizing agent; and
an asphalt coating on a surface of the dried base mat.

The roof cover board of the present invention may be attached to the roofing membrane via asphalt or other adhesive, may be attached to the layer of insulation via asphalt or other adhesive, or may be attached to the layer of insulation via screws or other mechanical fastener.

Typically the dried base mat of the roof cover board has a density of about 10 pcf to about 15 pcf (160 to 240 kg per cubic meter), for example, the dried base mat of the roof cover board may have a density of about 13 pcf to about 15 pcf (208 to 240 kg per cubic meter) or about 14 pcf to about 15 pcf (224 to 240 kg per cubic meter).

Preferably for the dried base mat of the roof cover board of this composite roofing structure;
 the mineral wool is at about 70 wt % to about 85 wt %,
 the glass fiber is at 0 wt % to about 5 wt %,
 the perlite is at about 0.5 wt % to about 6 wt %,
 the binder is at about 5 wt % to about 8 wt %,
 the gypsum is at about 0.5 wt % to about 3 wt %, and
 the sizing agent is at about 0.25 wt % to about 1 wt %; and
wherein the dried base mat of the roof cover board has a density of about 11 pcf to about 14 pcf (176 to 224 kg per cubic meter) and a thickness of about ¼ in to about ¾ in.

More preferably for the dried base mat of the roof cover board of this composite roofing structure:
 the mineral wool is at about 75 wt % to about 85 wt %,
 the glass fiber is at 0 wt % to about 3 wt %,
 the perlite is at about 0.5 wt % to about 2 wt %,
 the binder is at about 5 wt % to about 7 wt %,
 the gypsum is at about 0.5 wt % to about 2 wt %, and
 the sizing agent is at about 0.25 wt % to about 0.5 wt %;
and
wherein the dried base mat of the roof cover board has a density of about 11 pcf to about 14 pcf (176 to 224 kg per cubic meter) and a thickness of about ⅜ in to about ⅝ in.

Advantages of the present invention may become apparent to those skilled in the art from a review of the following detailed description, taken in conjunction with the examples, and the appended claims. It should be noted, however, that while the invention is susceptible of examples in various forms, described hereinafter are specific examples of the invention with the understanding that the present disclosure is intended as illustrative, and is not intended to limit the invention to the specific examples described herein.

As used in the present specification at the very least, and not as an attempt to limit the application of the doctrine of equivalents to the scope of the claim, each numerical parameter modified by the term "about" should at least be construed in light of the number of reported significant digits and by applying ordinary rounding techniques

DETAILED DESCRIPTION OF THE INVENTION

All percentages and ratios used herein, unless otherwise specified, are by weight (i.e., wt. %) unless otherwise indicated.

Figure 1:
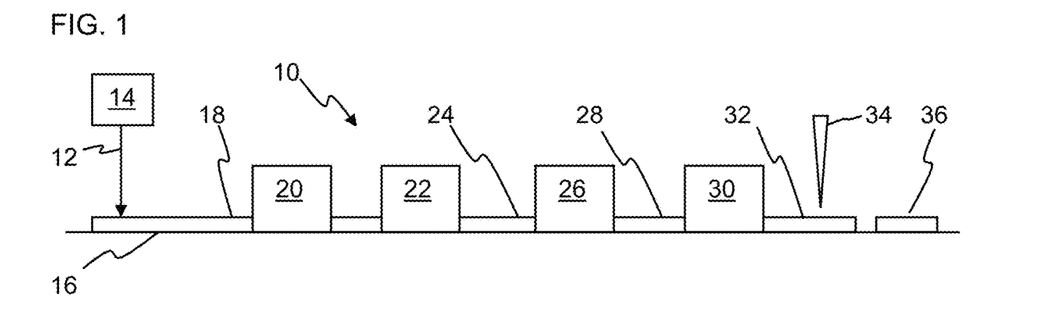
FIG. 1 schematically shows an exemplary method of making the roof cover board of the present invention.
Figure 2:
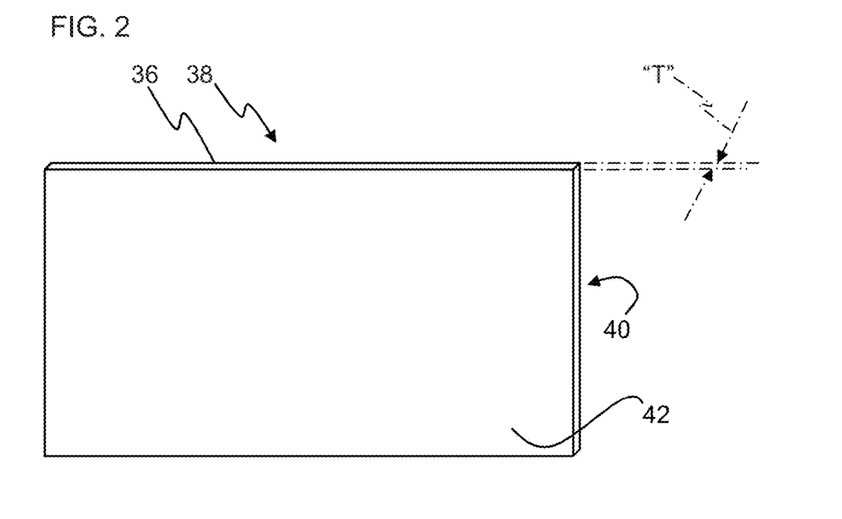
FIG. 2 shows an isometric view of a roof cover board of the present invention.

FIG. 1 schematically shows a water felting line 10 to make the dried base mat 32 and roof cover board of the present invention. As shown in FIG. 2, in the process, the aqueous slurry 12 of the composition is flowed from an agitated holding tank 14 (also referred to in the art as a headbox) onto a moving foraminous support wire 16 where it forms a filter cake 18 that is dewatered, first by gravity in gravity dewatering unit 20 and then by vacuum in vacuum dewatering unit 22. The speed of the moving foraminous support wire 24 and amount of aqueous slurry 12 flowed from an agitated holding tank 14 should be adjusted to achieve a final density of about 10 pcf to about 12 pounds per cubic foot (pcf)(160 to 192 kg per cubic meter). The foregoing parameters may vary by machine as would be apparent to one skilled in the art.

The dewatered cake 24 is then pressed in a pressing unit 26 (e.g., a pressing roll) to reduce the thickness of the dewatered cake 24 about 10% to about 50%, or preferably 10% to 25%, to a thickness of about ½ inch to about 1 inch to form the base mat 28. The pressing step further dewaters the base mat 28. The base mat 28 is then passed into a drying kiln 30 in which the moisture in the base mat is reduced to less than 5 wt %, preferably less than 2 wt %, and more preferably less than 1 wt %, which produces a dried base mat 32.

Optionally, the base mat 28 may be further dewatered with a vacuum dewatering unit (not shown) before introduction to the dryer 30. The dried base mat 32 is then cut by a blade 34 to form cut dried base mats 36 for roof cover boards.

The dried base mats 36 can have a density of about 10 pounds per cubic foot (pcf) to about 16 pcf (160 to 256 kg per cubic meter), preferably 11 pcf to 14 pcf (176 to 224 kg per cubic meter), and more preferably 12 pcf to about 13 pcf.

FIG. 2 shows a roof cover board 38 of the present invention having a back surface 40, a face surface 42, and a thickness "T". In some instances, the cut dried base mats 36 may be used as roof cover boards 38.

Figure 3:
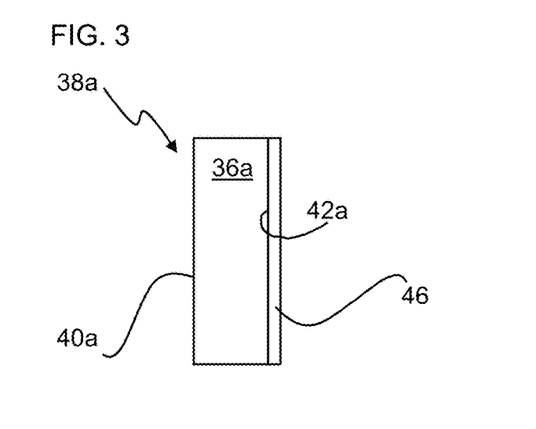
FIG. 3 shows a cross-sectional view of a roof cover board according to some instances of the present invention.

FIG. 3 illustrates a cross-sectional view of an alternative roof cover board 38a according to some instances of the present invention where a surface (illustrated as the face surface 42a, but alternatively could be the back surface 40a or to the back surface 40a and the face surface 42a) of a dried base mat 36a has a coating or laminate 46 applied thereto. The coating or laminate 46 can add additional strength and water resistance to the roof cover board.

An exemplary laminate includes a glass mat laminate (also referred to as a glass scrim), which may be formed of uncoated fiberglass, polyvinyl chloride (PVC) coated fiberglass, epoxy coated fiberglass, or plastisol resin coated fiberglass.

An exemplary coating includes asphalt, sodium silicate, clay, and the like, or a mixture thereof.

The compositions of the roof cover boards of the present invention have as their primary component (i.e., most abundant component) either (1) perlite alone, (2) a combination of perlite and mineral wool, or (3) mineral wool alone and are referred to herein as (1) "perlite-based roof cover boards," (2) mineral wool/perlite-based roof cover boards," and (3) "mineral wool-based roof cover boards," respectively.

TABLE 1 lists components and the properties of a perlite-based roof cover board of the invention and the components on a water free basis of the corresponding slurry. The perlite-based roof cover board includes perlite and mineral wool in the base mat at a combined concentration of up to about 90%. Optionally, the perlite-based roof cover board may include a coating or glass mat laminate on the face surface, a back surface, or both. In some instances, the perlite-based roof cover boards may be suitable for use as entry level roof cover boards.

TABLE 2 lists components and the properties of a mineral wool/perlite-based roof cover board of the invention and the components on a water free basis of the corresponding slurry. The mineral wool/perlite-based roof cover board includes mineral wool and perlite in the base mat at a combined concentration of up to about 92%. Optionally, the mineral wool/perlite-base roof cover board may include a coating or glass mat laminate on the face surface, a back surface, or both. In some instances, the mineral wool/perlite-based roof cover boards may be suitable for use as an intermediate roof cover board.

TABLE 3 lists components and the properties of a mineral wool-based roof cover board of the invention and the components on a water free basis of the corresponding slurry. The mineral wool-based roof cover board includes mineral wool in the base mat at a concentration of up to about 90%. Optionally, the mineral wool-base roof cover board may include a coating or glass mat laminate on the face surface, a back surface, or both. In some instances, the mineral wool-based roof cover boards may be suitable for use as premium roof cover boards.

The invention is a roof cover board that comprises mineral fiber according to the Roof Cover Board Formulations 1, 2, or 3 in TABLES 1, 2, and 3, respectively, optionally with the glass mat laminates, coatings, or both described herein. In TABLES 1 and 2 each "Preferred" range or "More Preferred" range is individually a preferred range or more preferred range for the invention. Thus, any "Preferred" range can be independently substituted for a corresponding "Useable range". Likewise, any "More Preferred range" can be independently substituted for a corresponding "Useable" range or a corresponding "Preferred" range. However, it is desirable to use all preferred ranges of a table together. It is more desirable to use all more preferred ranges of a table together.

TABLE 1

Roof Cover Board Formulation 1
(Perlite-Based Roof Cover Board)

| | Useable Range | Preferred Range | Most Preferred Range | Specific Example |
|---|---|---|---|---|
| Mineral Wool (wt %) | 8 to 25 | 8 to 20 | 15 to 20 | 18 |
| Binder (wt %) | 9 to 15 | 9.5 to 13 | 9.5 to 10.5 | 9.5 |
| Cellulosic Fiber (wt %) | 9 to 15 | 10 to 14.5 | 12 to 14 | 12 |
| Perlite (wt %) | 40 to 65 | 45 to 65 | 55 to 65 | 60 |
| Sizing Agent (wt %) | 0.25 to 2 | 0.25 to 1 | 0.25 to 0.5 | 0.5 |
| Density (pcf) without Coating and/or Glass Laminate | 10 to 17 | 10 to 15 | 11 to 14 | 12 |
| Density (pcf) with Coating and/or Glass Laminate | 11 to 18 | 12 to 16 | 12 to 14 | 13 |
| Thickness (inches) | ¼ to 1 | ¼ to ¾ | ⅜ to ⅝ | ½ |

For example, the dried base mat of the roof cover board may have a density of about 15 pcf to about 17 pcf (240 to 272 kg per cubic meter) or about 16 pcf to about 17 pcf (256 to 272 kg per cubic meter). Also, the roof cover board may have a thickness of about ¼ inch to about 1 inch (0.635 to 2.54 cm),

TABLE 2

Roof Cover Board Formulation 2
(Mineral Wool/Perlite-Based Roof Cover Board)

| | Useable Range | Preferred Range | Most Preferred Range | Specific Example |
|---|---|---|---|---|
| Mineral Wool (wt %) | 30 to 70 | 40 to 60 | 45 to 50 | 48 |
| Binder (wt %) | 5 to 15 | 5 to 10 | 6.5 to 8.5 | 7.5 |
| Cellulosic Fiber (wt %) | 2 to 20 | 8 to 15 | 11 to 13 | 12 |
| Perlite (wt %) | 10 to 50 | 20 to 40 | 30 to 35 | 32 |
| Sizing Agent (wt %) | 0.25 to 2 | 0.25 to 1 | 0.25 to 0.5 | 0.5 |
| Density (pcf) without Coating and/or Glass Laminate | 10 to 17 | 10 to 15 | 11 to 14 | 12 |
| Density (pcf) with Coating and/or Glass Laminate | 11 to 18 | 12 to 16 | 12 to 14 | 13 |
| Thickness (inches) | ¼ to 1 | ¼ to ¾ | ⅜ to ⅝ | ½ |

For example, the dried base mat of the roof cover board may have a density of about 15 pcf to about 17 pcf (240 to 272 kg per cubic meter) or about 16 pcf to about 17 pcf (256 to 272 kg per cubic meter). Also, the roof cover board may have a thickness of about ¼ inch to about 1 inch (0.635 to 2.54 cm).

TABLE 3

Roof Cover Board Formulation 3
(Mineral Wool-Based Roof Cover Board)

| | Useable Range | Preferred Range | Most Preferred Range | Specific Example |
|---|---|---|---|---|
| Mineral Wool (wt %) | 60 to 90 | 70 to 85 | 75 to 80 | 90 |
| Glass Fiber (wt %) | 0 to 10 | 0 to 5 | 0 to 3 | 1.5 |
| Binder (wt %) | 4 to 10 | 5 to 8 | 5 to 7 | 6 |
| Gypsum (wt %) | 0 to 5 | 0.5 to 3 | 0.5 to 2 | 1 |
| Perlite (wt %) | 0 to 10 | 0.5 to 6 | 0.5 to 2 | 1 |
| Sizing Agent (wt %) | 0.25 to 2 | 0.25 to 1 | 0.25 to 0.5 | 0.5 |
| Density (pcf) without Coating and/or Glass Laminate | 10 to 15 | 11 to 14 | 13 to 14 | 13 |

TABLE 3-continued

Roof Cover Board Formulation 3
(Mineral Wool-Based Roof Cover Board)

|  | Useable Range | Preferred Range | Most Preferred Range | Specific Example |
|---|---|---|---|---|
| Density (pcf) with Coating and/or Glass Laminate | 11 to 17 | 12 to 16 | 13 to 15 | 14 |
| Thickness (inches) | ¼ to 1 | ¼ to ¾ | ⅜ to ⅝ | ½ |

For example, the dried base mat of the roof cover board may have a density of about 13 pcf to about 15 pcf (208 to 240 kg per cubic meter) or about 14 pcf to about 15 pcf (224 to 240 kg per cubic meter). Also, the roof cover board may have a thickness of about ¼ inch to about 1 inch (0.635 to 2.54 cm).

Roof Cover Board Formulation 3 typically has an absence of cellulosic fibers.

Mineral Wool

The disclosed compositions contain mineral wool of the type conventionally used in roof cover boards. Mineral wool in an roof cover board increases the sound absorption of the roof cover board. In general, the higher the amount of mineral wool the better the sound absorption. Mineral wool also advantageously gives bulking to the slurry during formation of the core. Mineral wool, also known as mineral fiber, mineral cotton, mineral fiber, man-made mineral fiber (MMMF), and man-made vitreous fiber (MMVF), is a general name for fiber materials that are formed by spinning or drawing molten minerals (or "synthetic minerals" such as slag and ceramics). The mineral wool may be any of the conventional mineral fibers prepared by attenuating a molten stream of basalt, granite, or other vitreous mineral constituent. The molten mineral is either drawn linearly through orifices, commonly referred to as textile fiber, or it is recovered tangentially off the face of a spinning cup or rotor, commonly referred to as wool fiber. Preferably the mineral wool is slag wool or basalt wool. Slag wool is a mineral wool made usually from molten blast-furnace slag by the action of jets of steam under high pressure. Basalt fiber is a material made from extremely fine fibers of basalt, which is composed of the minerals plagioclase, pyroxene, and olivine.

Typically, basalt wool fibers have a diameter of about 5 microns to about 10 microns. Further, commercially available basalt wool fibers include as much as 40% (e.g., about 20% to about 40%) unfiberized material, which is referred to in the art as shot. Typically, slag wool fibers have a diameter of about 2 microns to about 5 microns. Further, commercially available slag wool fibers can include above about 50% (e.g., about 30% to about 60%) shot. The mineral wool used in the inventive compositions and methods described herein may include shot at high concentrations that are typically commercially available or may have a reduced shot concentration achieved, for example, by passing the mineral wool through an air classifier.

On a dry basis for the perlite-based roof cover board, the mineral wool constituent is present in an amount ranging from about 8 wt % to about 25 wt %, more preferably about 8 wt % to about 20 wt %, most preferably about 15 wt % to about 20 wt % in the products and processes of the present invention. Glass fibers are not mineral wool.

On a dry basis for the mineral wool/perlite-based roof cover board, the mineral wool constituent is present in an amount ranging from about 30 wt % to about 70 wt %, more preferably about 35 wt % to about 60 wt %, further more preferably about 40 wt % to about 60 wt %, most preferably about 45 wt % to about 50 wt % in the products and processes of the present invention. Glass fibers are not mineral wool.

On a dry basis for the mineral wool-base roof cover board, the mineral wool constituent is present in an amount ranging from about 60 wt % to about 90 wt %, more preferably about 70 wt % to about 85 wt %, most preferably about 75 wt % to about 80 wt % in the products and processes of the present invention. Glass fibers are not mineral wool.

Binder

The binders suitable for use in the roof cover board tiles of the present invention include latex binders, starch binders, and a mixture of latex and starch binders. In some instance, starch binders are preferred.

Starch may or may not be cooked prior to use. A starch gel may be prepared by dispersing starch particles in water and heating the slurry until the starch is fully or partially cooked and the slurry thickens to a viscous gel. However, if conventional hydropulped fibers are used as a supplemental source of fiber, they may be incorporated into the starch slurry prior to cooking. The cooking temperature of the starch slurry should be closely monitored to assure the desired degree of swelling of the starch granules. The cooking temperature for cornstarch can range from about 160° F. (71° C.) to about 195° F. (90° C.). Starch may also be used as a binder without pre-cooking the starch, because it forms a gel during the process of drying the base mat. Cornstarch is the preferred binder.

The latex may include acrylic binder, a polyester binder, an acrylo-polyester binder, and mixtures thereof.

Increased binder content, in the form of starch, can be used to increase strength (MOR-modulus of rupture (psi)) and hardness and enhance the cutability of the finished roof cover board.

On a dry basis for the perlite-based roof cover board, the binder is present from 9 wt % to about 15 wt %, preferably from about 9.5 wt % to about 13 wt %, more preferably from about 9.5 wt % to about 10.5 wt % in the products and processes of the present invention.

On a dry basis for the mineral wool/perlite-based roof cover board, the binder is present from 5 wt % to about 15 wt %, preferably from about 5 wt % to about 10 wt %, more preferably from about 6.5 wt % to about 8.5 wt % in the products and processes of the present invention.

On a dry basis for the mineral wool-base roof cover board, the binder is present from 4 wt % to about 10 wt %, preferably from about 5 wt % to about 8 wt %, more preferably from about 5 wt % to about 7 wt % in the products and processes of the present invention.

Perlite

An ingredient of the disclosed compositions is a perlite. Expanded perlite is preferred for its low cost and performance. The expanded perlite provides porosity and "loft" in the final product, which enhances acoustical properties.

Perlite is a form of glassy rock, similar to obsidian with the capacity to expand greatly on heating. Perlite generally contains 65 wt % to 75 wt % $SiO_2$, 10 wt % to 20 wt % $Al_2O_3$, 2 wt % to 5 wt % $H_2O$, and smaller amounts of sodium, potassium, iron and calcium oxides. Expanded perlite denotes any glass rock and more particularly a volcanic glass that has been expanded suddenly or "popped" while being heated rapidly. This "popping" generally occurs when the grains of crushed perlite are heated to the temperatures of incipient fusion. The water contained in the particles is converted into steam and the crushed particles expand to form light, fluffy, cellular particles. Volume increases of the particles of at least ten fold are common. Expanded perlite is generally characterized by a system of concentric, spheroidal cracks, which are called perlite structure. Different types of perlite are characterized by variations in the composition of the glass affecting properties such as softening point, type and degree of expansion, size of the bubbles and wall thickness between them, and porosity of the product.

In the conventional process of preparing expanded perlite, the perlite ore is first ground to a fine size. The perlite is expanded by introducing the finely ground perlite ore into the heated air of a perlite expander. Typically the expander heats the air to about 1750° F. (955° C.). The finely ground perlite is carried by the heated air which heats the perlite and causes it to pop like popcorn to form the expanded perlite having a density of about 3 to 10 pounds per cubic foot. When expanded perlite is placed in contact with water, the water penetrates the cracks and fissures and enters into the air filled cavities of the perlite, thereby causing the perlite to retain large amounts of water within the expanded perlite particles.

Using the relatively high density perlite, i.e., a perlite which has been expanded to a density of over 7 or 8 pcf (112 or 128 kg per cubic meter) (versus the normal range of 3 to 5 pcf (48 to 80 kg per cubic meter)), lowers the water needed to form a suitable slurry. See, U.S. Pat. No. 5,911,818 to Baig. The aqueous slurry with less water requires less dewatering, and produces a base mat having less water retained by the perlite. The resulting product has improved compressive resistance and maintained fire ratings, as defined by ASTM E119-16a. The base mat having a lower water content can be dried faster which allows the entire water felting line to be run at higher speed.

High density perlite is also beneficial when manufacturing fire rated roof cover boards that must meet a minimum density. However, when the density of the expanded perlite exceeds about 20 pcf (320 kg per cubic meter), the perlite does not produce as much "loft" or bulk in the final product. As a result, the density of the final product may be too high to maintain the low thermal conductivity required to pass the ASTM E119 fire endurance test.

On a dry basis for the perlite-based roof cover board, the perlite, of either the high or low density type, is present from about 40 wt % to about 65 wt %, preferably about 45 wt % to about 65 wt %, more preferably about 55 wt % to about 65 wt % in the products and processes of the present invention.

On a dry basis for the mineral wool/perlite-based roof cover board, the perlite, of either the high or low density type, is present from about 10 wt % to about 50 wt %, preferably about 20 wt % to about 40 wt %, more preferably about 30 wt % to about 35 wt % in the products and processes of the present invention.

On a dry basis for the mineral wool-base roof cover board, the perlite, of either the high or low density type, is present from about 0 wt % to about 10 wt %, preferably about 0.5 wt % to about 6 wt %, more preferably about 0.5 wt % to about 2 wt % in the products and processes of the present invention.

Gypsum

Gypsum is a commonly used low cost inorganic material in roof cover boards and related base mat and slurry compositions. The gypsum is calcium sulfate dihydrate, $CaSO_4 \cdot 2H_2O$. Gypsum has limited solubility in water and acts as a flocculent. By functioning as a flocculent in the slurry, the gypsum helps to retain and uniformly distribute the fine particles (inorganic clay, organic starch, short cellulosic fibers, etc.) in the mat during the processing (dewatering, vacuum and wet pressing).

In some instances, the perlite-based roof cover boards and the mineral wool/perlite-based roof cover boards of the invention, as well as the corresponding dried base mat and the slurry in the process for making the perlite-based roof cover boards and the mineral wool/perlite-based roof cover boards of the invention, preferably has an absence of gypsum unless included in a coating or laminate.

Gypsum may optionally be included in the mineral wool-base roof cover board of the present in. When included, gypsum is present, on a dry basis in the mineral wool-base roof cover board, from 0.1 wt % to about 5 wt %, preferably about 0.5 wt % to about 3 wt %, more preferably about 0.5 wt % to about 2 wt % in the products and processes of the present invention. If desired, the mineral wool-base roof cover boards of the invention, as well as the corresponding dried base mat and the slurry in the process for making the mineral wool-base roof cover board of the invention can have an absence of gypsum.

Cellulosic Fiber

Cellulosic fibers can serves to provide both wet strength (i.e., the strength of the wet mat prior to drying) and dry strength. The cellulosic fibers may also function as a binder and may help to retain fines.

Preferably the cellulosic fiber is newsprint (also known as ("news"), e.g., hydropulped newsprint. Refined paper fibers and wood fiber may also be used as the source of the cellulosic fiber. Cellulosic fibers can be obtained from the bark, wood or leaves of plants, or from a plant-based material. Besides cellulose, these fibers are compound of hemicellulose and lignin, and different percentages of these components are responsible for different mechanical properties observed.

Cellulosic fibers can be included in the perlite-based roof cover board of the present invention. On a dry basis for the perlite-based cover board, cellulosic fibers are present from about 9 wt % to about 15 wt %, preferably about 10 wt % to about 14.5 wt %, more preferably about 12 wt % to about 14 wt % in the products and processes of the present invention. However, Roof Cover Board Formulation 3 typically has an absence of cellulosic fibers.

Cellulosic fibers can be included in the mineral wool/perlite-based roof cover board of the present in. On a dry basis for the mineral wool/perlite-based cover board, cellulosic fibers are present from about 2 wt % to about 20 wt %, preferably about 8 wt % to about 15 wt %, more preferably about 11 wt % to about 13 wt % in the products and processes of the present invention.

The mineral wool-base roof cover boards of the invention, as well as the corresponding dried base mat and the slurry in the process for making the mineral wool-base level roof cover boards of the invention, preferably has an absence of cellulosic fibers.

Sizing Agent

The sizing agent is a water-based emulsion that can be included in the aqueous slurry when producing the dried base mat. The water-based emulsion includes a suspending agent (e.g., a surfactant or polymer) and a chemical barrier component that imparts hydrophobic, oleophobic, and/or release properties to the dried base mat. Exemplary sizing agents can include sizing agents with a chemical barrier component that includes waxes (e.g., paraffin wax, polyethylene wax, isoparaffinic wax, microcrystalline wax, or natural wax), polyurethane, siloxanes, silicone fluids, alkyl ketene dimer, alkyl ketene multimer, alkenyl succinic anhydride, alkyl substituted succinic anhydrides, alkyl substituted succinic melamines, alkyl substituted imidazolidones, styrene maleic anhydride, styrene acrylic acid, ethylene acrylic acid, 1,1-octadecoxyoctadecane, the distearyl acetal of stearyl aldehyde, cellulose stearate, calcium stearate, a copolymer of diallylamine and acrylamide, and the like. For example, a suitable sizing agent is EMULSION 8162 (an alkyl substituted synthetic nitrogen derivative, namely an alkyl substituted imidazolidone, available from Bercen, Inc.). The polyurethane is distributed so it does not form a cellular structure. There can be an absence of polyurethane and polyiscyanurate. There can be an absence of siloxanes and/or silicone fluids. Other suitable sizing agent may be, but are not limited to, alkaline sizing agents and acid-based sizing agents. Examples of alkaline sizing agents include without limitation unsaturated hydrocarbon compounds, such as C6 to C24, preferably C18 to C20, unsaturated hydrocarbon compounds and mixtures thereof. Examples of acid-based sizing agents include without limitation alum and rosin-based sizing agents such as Plasmine N-750-P from Pasmine Technology Inc. Further examples of sizing agents that may be incorporated into the present invention may include, but is not limited to, those found in the following patents: U.S. Pat. Nos. 6,595,632, 6,512,146, 6,316,095, 6,273,997, 6,228,219, 6,165,321, 6,126,783, 6,033,526, 6,007,906, 5,766,417, 5,685,815, 5,527,430, 5,011,741, 4,710,422, and 4,184,914, which are hereby incorporated in their entirety by reference. Typical alkaline sizing agent may be, but not limited to, alkyl ketene dimer, alkenyl ketene dimer and alkenyl succinic anhydride. Other typical sizing agents are wax, styrene maleic anhydride, polyethylene wax, silicone, carboxyl methyl cellulose, alkyl ketene dimer or mixtures thereof. Other typical sizing agents are alkyl succinic anhydride, alkyl ketene dimer or a combination of rosin and alum. The dried base mat of the present invention may contain from about 0.25 wt % to about 2 wt % of the sizing agent based upon the total weight of the base mat. This range includes 0.25, 0.3, 0.4, 0.5, 0.6, 0.7, 0.8, 0.9, 1.0, 1.1, 1.2, 1.3, 1.4, 1.5 1.6, 1.7, 1.8. 1.9 and 2.0 wt %, including any and all ranges and subranges therein.

Thus, the sizing agents may be selected from the group of waxes, polyurethane, siloxanes, silicone fluids, alkyl ketene dimer, alkyl ketene multimer, alkenyl succinic anhydride, alkyl substituted succinic anhydrides, alkyl substituted succinic melamines, alkyl substituted imidazolidones, styrene maleic anhydride, styrene acrylic acid, ethylene acrylic acid, 1,1-octadecoxyoctadecane, the distearyl acetal of stearyl aldehyde, cellulose stearate, calcium stearate, a copolymer of diallylamine and acrylamide, alkyl substituted synthetic imidazolidone, alkaline sizing agents, acid-based sizing agents C6 to C24 unsaturated hydrocarbon compounds, alum and rosin-based sizing agents, alkyl ketene dimer, alkenyl ketene dimer, alkenyl succinic anhydride, carboxyl methyl cellulose, alkyl ketene dimer alkyl succinic anhydride, and mixtures thereof.

Thus, there may be an absence of polyurethane, polyisocyanurate, siloxanes and silicone fluid.

However, the roof cover boards of the invention, as well as the corresponding dried base mat and the slurry in the process for making the roof cover boards of the invention, may have an absence of siloxanes and silicone fluids, unless included in a coating or laminate. Thus, the dried base mat and the slurry in the process for making the roof cover boards of the invention, may have an absence of siloxanes and silicone fluids.

Sizing agent may be included in the products and processes of the present invention. The sizing agent is present, on a dry basis for the perlite-based roof cover board, the mineral wool/perlite-based roof cover board, or the mineral wool-based roof cover board, from 0.25 wt % to about 2 wt %, preferably about 0.25 wt % to about 1 wt %, more preferably about 0.25 wt % to about 0.5 wt % in the products and processes of the present invention.

Additives

In some instances, the perlite-based roof cover board and the mineral wool/perlite-based roof cover board of the invention, as well as the corresponding dried base mat and the slurry in the process for making said roof cover boards of the invention, preferably has an absence of glass fibers unless included in a coating or laminate.

Glass fibers may optionally be included in the mineral wool-base roof cover board of the present in. When included, glass fibers are present, on a dry basis in the mineral wool-base roof cover board, from about 0.1 wt % to about 10 wt %, preferably about 0.5 wt % to about 5 wt %, more preferably about 0.5 wt % to about 3 wt % in the products and processes of the present invention. If desired, the mineral wool-base roof cover boards of the invention, as well as the corresponding dried base mat and the slurry in the process for making the mineral wool-base roof cover board of the invention can have an absence of glass fibers unless included in a coating or laminate.

The roof cover boards of the invention, as well as the corresponding dried base mat and the slurry in the process for making the roof cover boards of the invention, preferably has an absence of wax emulsions unless included in a coating or laminate.

The roof cover boards of the invention, as well as the corresponding dried base mat and the slurry in the process for making the roof cover boards of the invention, preferably has an absence of siloxanes unless included in a coating or laminate.

The roof cover boards of the invention, as well as the corresponding dried base mat and the slurry in the process for making the roof cover boards of the invention, preferably has an absence of silicone fluids unless included in a coating or laminate.

The roof cover boards of the invention, as well as the corresponding dried base mat and the slurry in the process for making the roof cover boards of the invention, preferably has an absence of polymer fibers unless included in a coating or laminate.

The roof cover boards of the invention, as well as the corresponding dried base mat and the slurry in the process for making the roof cover boards of the invention, preferably has an absence of glass beads unless included in a coating or laminate.

The roof cover boards of the invention, as well as the corresponding dried base mat and the slurry in the process for making the roof cover boards of the invention, preferably has an absence of clay unless included in a coating or laminate. Thus, the dried base mat and the slurry in the process for making the roof cover boards of the invention, may have an absence of clay.

The roof cover boards of the invention, as well as the corresponding dried base mat and the slurry in the process for making the roof cover boards of the invention, preferably has an absence of vermiculite unless included in a coating or laminate. Thus, the dried base mat and the slurry in the process for making the roof cover boards of the invention, may have an absence of vermiculite.

The roof cover boards of the invention, as well as the corresponding dried base mat and the slurry in the process for making the roof cover boards of the invention, preferably has an absence of calcium carbonate unless included in a coating or laminate. Thus, the dried base mat and the slurry in the process for making the roof cover boards of the invention, may have an absence of calcium carbonate.

The roof cover boards of the invention, as well as the corresponding dried base mat and the slurry in the process for making the roof cover boards of the invention, preferably has an absence of magnesium carbonate unless included in a coating or laminate. Thus, the dried base mat and the slurry in the process for making the roof cover boards of the invention, may have an absence of magnesium carbonate.

The roof cover boards of the invention, as well as the corresponding dried base mat and the slurry in the process for making the roof cover boards of the invention, preferably has an absence of zinc pyrithione unless included in a coating or laminate. Thus, the dried base mat and the slurry in the process for making the roof cover boards of the invention, may have an absence of zinc pyrithione.

The roof cover boards of the invention, as well as the corresponding dried base mat, and the slurry in the process for making the roof cover boards of the invention, preferably has an absence of $B_2O_3$ (boron trioxide) and other boron compounds unless included in a coating or laminate. Thus, the dried base mat and the slurry in the process for making the roof cover boards of the invention, may have an absence of $B_2O_3$ (boron trioxide) and other boron compounds. The roof cover boards of the invention, as well as the corresponding dried base mat, and the slurry in the process for making the roof cover boards of the invention, preferably has an absence of cationic polyacrylamide.

Preferably the perlite-based roof cover boards and the mineral/wool-based roof cover boards of the invention, as well as the corresponding dried base mat and the slurry in the process for making said roof cover boards of the invention, has an absence of one or more or all the following ingredients: glass fibers, gypsum, wax emulsions, siloxanes, silicone fluids, glass beads, polymer fibers, clay, vermiculite, calcium carbonate, magnesium carbonate, and zinc pyrithione unless included in a coating or laminate. Thus, the dried base mat and the slurry in the process for making the roof cover boards of the invention, may have an absence of one or more or all the following ingredients: glass fibers, gypsum, wax emulsions, siloxanes, silicone fluids, glass beads, polymer fibers, clay, vermiculite, calcium carbonate, magnesium carbonate, and zinc pyrithione. Preferably the dried base mat, and the slurry in the process for making the roof cover boards of the invention, also have an absence of $B_2O_3$ (boron trioxide) and other boron compounds.

Preferably the mineral wool-base roof cover boards of the invention, as well as the corresponding dried base mat and the slurry in the process for making the mineral wool-base roof cover boards of the invention, has an absence of all the following ingredients: cellulosic fibers, wax emulsions, siloxanes, silicone fluids, glass beads, polymer fibers, clay, vermiculite, calcium carbonate, magnesium carbonate, and zinc pyrithione unless included in a coating or laminate. Preferably, the mineral wool-base roof cover boards can be further absent one or more of: glass fibers, gypsum, and perlite. Thus, the dried base mat and the slurry in the process for making the roof cover boards of the invention, may have an absence of all the following ingredients: cellulosic fibers, wax emulsions, siloxanes, silicone fluids, glass beads, polymer fibers, clay, vermiculite, calcium carbonate, magnesium carbonate, and zinc pyrithione. Preferably, the dried base mat, and the slurry in the process for making the roof cover boards of the invention, also has an absence of $B_2O_3$ (boron trioxide) and other boron compounds.

The foregoing additive exclusions are on a water free basis so it does not exclude water.

Properties

Preferably, the roof cover boards of the invention, as well as the corresponding dried base mats of the invention, have a thickness of about ¼ in (6.4 mm) to about 1 in (25.4 mm), preferably about ¼ in (6.4 mm) to about ¾ in (19 mm), more preferably about ⅜ in (9.5 mm) to about ⅝ in (15.9 mm).

Preferably, the roof cover boards of the invention that include a coating and/or glass laminate have a density of about 10 pcf (160 kg/m$^3$) to about 17 pcf (272 kg/m$^3$), more preferably about 11 pcf (176 kg/m$^3$) to about 14 pcf (224 kg/m$^3$).

Preferably, the roof cover boards of the invention that do not include a coating and/or glass laminate have a density of about 11 pcf (176 kg/m$^3$) to about 18 pcf (288 kg/m$^3$), more preferably about 12 pcf (192 kg/m$^3$) to about 15 pcf (240 kg/m$^3$).

Advantageously, the roof cover boards of the invention have enhanced acoustical properties (e.g., improved sound dampening) over polymer-based roof cover boards.

Noise reduction coefficient (NRC) per ASTM C423-17 and ceiling attenuation class (CAC) per ASTM E 1414-16, which are traditionally used to measure the acoustical properties of ceiling tiles, can be used to measure the acoustical properties of the roof cover boards of the present invention. For a ½ in thick perlite-based, mineral wool/perlite-based, or mineral wool-based roof cover board of the present invention, the NRC may be about 0.50 to about 0.85, and the CAC may be about 25 to about 35. For a ¾ in thick perlite-based, mineral wool/perlite-based, or mineral wool-based roof cover board of the present invention, the NRC may be about 0.60 to about 0.95, and the CAC may be about 25 to about 35.

The perlite-based roof cover boards of the present invention can have a modulus of rupture (MOR) of about 40 psi to about 200 psi according to ASTM C473-16 and a compressive strength of about 20 psi to about 75 psi according to ASTM C209-15. The mineral wool/perlite-based roof cover boards of the present invention can have a modulus of rupture (MOR) of about 40 psi to about 200 psi according to ASTM C473-16 and a compressive strength of about 40 psi to about 100 psi according to ASTM C209-15. The mineral wool-base roof cover boards of the present invention can have a MOR of about 50 psi to about 150 psi according to ASTM C473-16 and a compressive strength of about 75 psi to about 250 psi according to ASTM C209-15.

Loss on Ignition (LOI)(%) is measured after heating the sample to 1000° F. (538° C.) for about 30 minutes. Perlite-based cover boards of the present invention may have an LOI % of about 10% to about 30%. Mineral wool/perlite-based cover boards of the present invention may have an LOI % of about 7% to about 35%. Mineral wool-base cover boards of the present invention may have an LOI % of about 4% to about 10%.

The water absorption of the roof cover boards of the present invention can be measured as the volume percent of water absorbed over 2 hours according to ASTM C473. The perlite-based, mineral wool/perlite-based and mineral wool-base roof cover boards of the present invention can have a water absorption of about 1 vol % to about 3.5 vol %.

Method of Using Roof Cover Board

A cover board is a thin substrate to which a roof membrane is adhered. Cover boards are installed directly under the membrane and above the insulation. Many are fastened directly down into the deck, or they can be adhered to insulation with low-rise foam adhesive or hot asphalt. To ensure cover boards are installed correctly: 1. Stagger the cover board and insulation joints 2. Install using approved fasteners with plates or adhesive and follow manufacturers' directions for fastener spacing 3. Only install what can be covered by a final membrane system within the same day. Selecting and installing the appropriate type of cover board can lead to energy efficiency and other benefits for the building. This in turn creates a higher performing building which is beneficial to the building owner and all occupants of the space.

Cover boards can be fully adhered or mechanically fastened to the existing substrate. Mechanical attachment should be completed in accordance with wind uplift requirements. Fully adhered cover boards should be applied in accordance with proper roofing procedures. Cover boards should be set over the bottom layer of insulation.

FM (Factory Mutual) is the default testing standard for wind uplift. Roof assemblies that have been tested can be found on FM's website. The testing is based on assemblies, not components. The two main FM testing standards are FM 4450 and FM 4470. FM 4450 tests Class 1 insulated metal decks. FM 4470 tests all other Class 1 roof covers. With FM Tests, the roof system is pressurized from below the deck to 30 pound per square foot (psf), and held for one minute. The pressure is increased by 15 psf increments every minute until failure.

UL (Underwriter's Laboratory) has two standards for testing wind loads: UL 580 and UL 1897. The test is in pounds per square foot. This is not a design number, but a test number. UL 580 is a dynamic pressure test. In addition to pressure from below, UL 580 draws a vacuum on top of the membrane. Pressure levels are varied throughout the duration of the test. UL 1897 is a static pressure test in which an apparatus that creates a steady negative pressure is placed on the top side of the membrane. Pressure is held for one minute and raised by 15 pounds per square foot (Psf) increments, until failure.

Wind uplift is a force that occurs when the pressure below a roof is greater than above it, and if the wind uplift is greater than the design of a roof system, it can blow the roof off the building. Design professionals will typically use ASCE 7-10 to find the proper wind load of a building. Once that design parameter is found, the default testing agencies are FM (4450, 4470) and UL (580, 1897).

To apply the cover board it should be secured to the bottom layer of insulation in a full and even application of hot asphalt or specially formulated adhesive (for example, low-rise foam adhesive or polyurethane adhesive).

The insulation board joints should be butted and aligned in both directions with the end joints staggered by maximum dimensions possible in relation to joints on the bottom layer of insulation. Make sure that the board ends and sides touch all along their length. Minor gaps in boards should be filled with roof adhesive. The joints of the insulation boards in the top layer should be vertically staggered and offset from the joints of the insulation boards in the bottom layer. The edges of the insulation boards should be square, flush and have moderate contact with the edges of the adjacent insulation boards. End joints between boards should be staggered.

Figure 4:
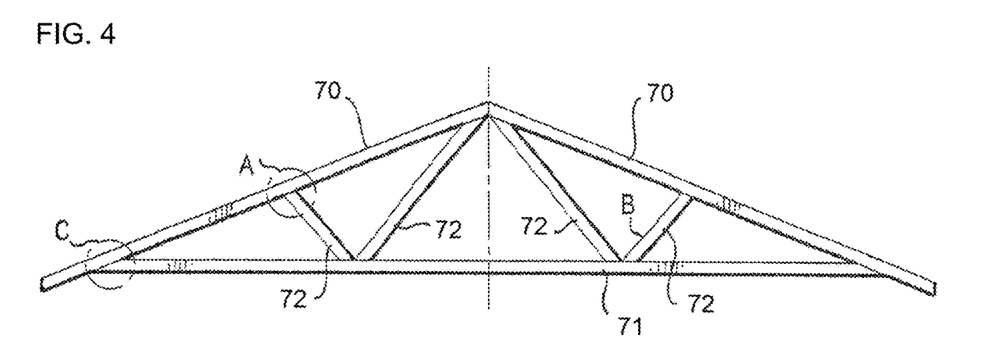
FIGS. 4 and 5 show in side elevation two forms of conventional roof trusses that may be employed with cover boards of the present invention.
Figure 5:
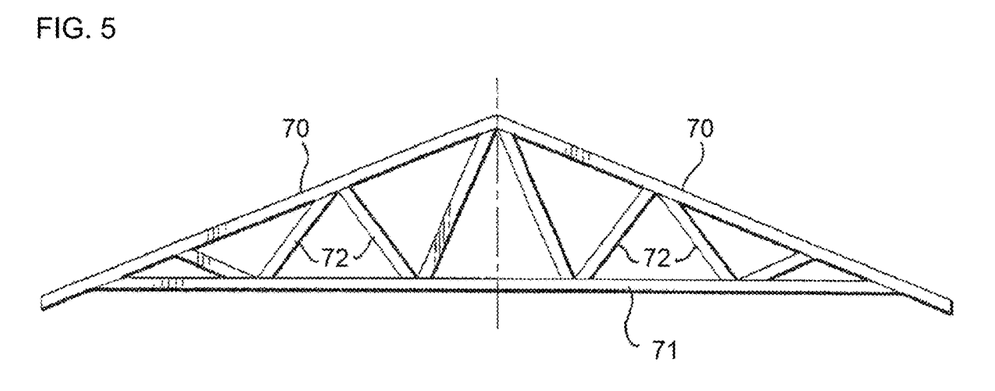

FIGS. 4 and 5 show in side elevation two forms of conventional roof trusses that may be employed with cover boards of the present invention. A conventional beam for roof trusses such as shown in FIGS. 4 and 5 has an upper chord 70 constituted by a beam supported from a lower chord 71 by web members 72. When erected upon a building the lower chord 71 spans wall frames (not shown) and is fixed on the wall frames so that a load carried upon the upper chords 70, intended as roof batten fixing portions for the roof, are subjected to axial compressive force as well as bending moment where engaged by the web members 72. Portion A of FIG. 4 is where the upper end of the webs 72 rest within upper chords 70 of the truss. Portion B of FIG. 4 is where the lower end of the webs 72 rest within lower chords 71 of the truss. Portion C of FIG. 4 shows securing the lower chord 71 to the upper chord 70 and to the top plate (not shown) of a wall structure. The framing is typically metal framing wherein the upper chord 70, lower chord 71 and webs 72 are typically roll formed from sheet metal. Chords 10, 11 and webs 12 may be secured by fasteners (not shown).

Figure 6:
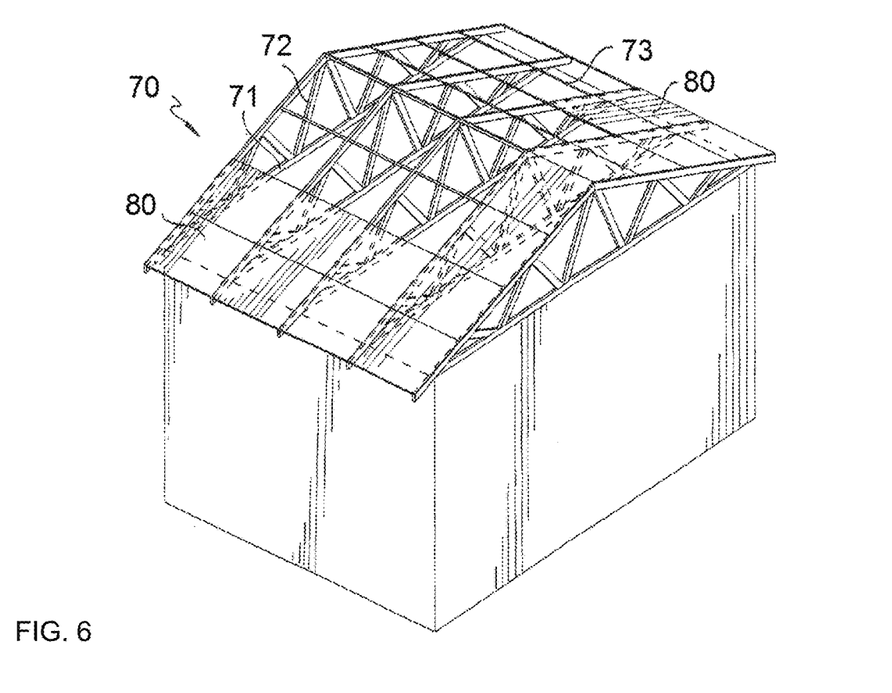
FIG. 6 shows an isometric view of conventional panels supported on and attached to framing of FIG. 5 as a substrate.

FIG. 6 shows an isometric view of conventional panels supported on and attached to framing of FIG. 5 as a substrate. The panels are, for example, plywood, corrugated metal sheet, or other structural panels. However, typically the panels are corrugated metal sheet on the metal frame. The framing has roof trusses having the upper chord 10 constituted by a beam supported from the lower chord 11 by web members 12. It also has purlins 13 attached to the roof trusses. FIG. 6 shows the panels parallel to the purlins 13. In an embodiment not shown, the panels of FIG. 6 could be applied such that they are rotated 90 degrees relative to the purlins 13.

From the bottom up a typical composite structure employing the present roof cover boards includes the following:

a metal roof deck, a layer of insulation cover board roofing membrane, shingles, gravel, or other top cover. The insulation is generally attached with screws or other fasteners to the metal roof deck. The bonding between the roof cover board and membrane is done by asphalt or other adhesive. The bonding between the insulation and roof cover board is done by another layer of asphalt or other adhesive, but if desired the roof cover board can be attached with screws or other fasteners to the metal roof deck.

Figure 7:
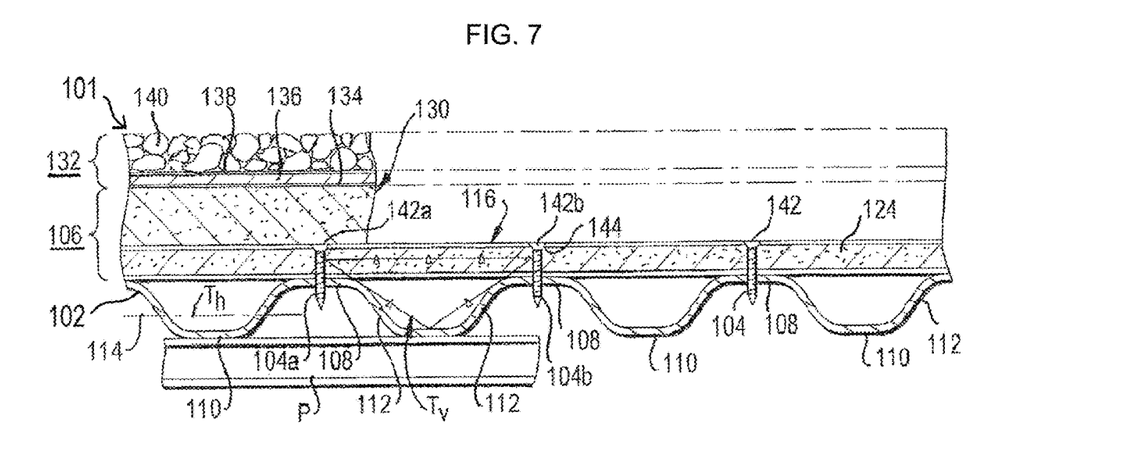
FIG. 7 shows a cross-sectional view of a composite roof assembly comprising a corrugated sheet supported from below by a purlin and roof insulation board secured to the corrugated sheet from above by mechanical fasteners.

FIG. 7 shows the present invention wherein the numeral 101 generally designates a composite roof assembly comprising a corrugated sheet 102 supported from below by a purlin P and roof insulation board 124 secured to the corrugated sheet 102 from above by mechanical fasteners (threaded screws) 104,104a, 104b. Screw 104 has a head 142. Screw 104a has a head 142a. Screw 104b has a head 142b. Corrugated sheet 102 typically has flat portions 108 and 110 of substantially equal length joined by connector portions 112 providing straight, parallel, regular, and equally curved ridges and hollows to define an angle Tv. This configuration has a substantially equal distribution of surface area of the corrugated sheet 102 above and below a neutral axis 114 of height Th. A first layer 116 of hot asphalt or other suitable adhesive material is applied over the insulation 124 surface 144. Insulation boards are typically low-density predominantly polymer foam material.

The particular roof covering 132 illustrated in the drawing comprises a second layer of asphalt 134, applied to the surface of the substrate 106, comprising roof cover board 130 and the roof insulation board 124 wherein the roof cover board 130 is over the layer of roof insulation board 124, over which is laid a suitable roofing membrane 136. A third layer 138 of hot asphalt or other suitable adhesive material is applied over membrane 136 and a layer 140 of gravel or other suitable surfacing material is applied thereto. The membrane 136 is any conventional roofing membrane. The membrane 136 provides a waterproof layer which prevents the penetration of water resulting from precipitation or condensation on the roof surface. The membrane 136 may be comprised of materials such as ethylene propylene diene monomer (EPDM) rubber, thermoplastic polyolefins (TPO), polyvinyl chloride (PVC), and modified bitumen. The membrane 136 may also comprise a composite including layers of hot applied asphalt, reinforcing fiberglass, cloth, or paper. Elastomeric sealers may also be used in combination with cloth to form a water-resistant membrane 136. Typical roofing membranes 136 are made of EPDM rubber, thermoplastic polyolefin (TPO), for example polyethylene, ketone ethylene ester (KEE), or polyvinyl chloride. The waterproof roofing membrane 136 is preferably adhered to the roof cover boards 130 with asphalt layer 134 (as shown) or an adhesive which has been applied in a predetermined pattern. Examples of suitable adhesives commonly used in construction include epoxy, polysufides, polyurethanes, ketone ethylene esters.

Some of the more common roof covers include slate, composition or wood shingles, composition roofing paper, roofing granules and tile. The type of roof cover and its method of attachment selected depends to a large extent upon the expense that can be justified to secure required performance on the particular building.

EXAMPLES

Example 1

Board Making Procedure

Wall panel boards were prepared using the following formulation: mineral wool; perlite; recycled newsprint; corn starch, and clay. The boards were formed with a 0.5 inch target thickness.

After forming the boards, the wet boards were dried in an air-circulating oven for 45 minutes at 600° F. After, the drying was completed at 300° F. (149° C.) for 3 hours. The TAPPI boards were cut into 3 inch×10 inch and 4 inch×4 inch samples and tested. Half of the board was as is and another half was spray coated or roll coated with sizing agent containing composition.

Test Procedures

MOR (Modulus of Rupture) and ball hardness measurements were carried out. 3 inch×10 inch samples were used for the MOR measurement. In the hardness test, a 2 inch diameter steel ball is pressed at a constant rate into the board to a depth of ⅛" and the maximum force is reported. Break Load is also known as flexural peak load.

4 inch×4 inch square samples were used for the water absorption test. The samples were first weighed individually, and then immersed in 70° F. tap water and held at a depth of approximately 6-8 inches below the water surface for 1 hour. After 1 hour, the samples were taken from the water and re-weighed after excess surface water had been removed by tapping with a dry paper towel.

Absolute 2 hour water absorption is expressed as the weight difference before and after immersion for each sample. The percent water absorption is the percent of water of absorbed compared to the original dry weight of the test sample.

This board composition was approximately Mineral Wool: 16 wt. %, Newsprint: 14 wt. %, Perlite 60 wt. %, Starch: 10 wt. %.

TABLE 4 compares a low density ceiling board dried base mat lacking sizing agent to boards of the present invention of the same composition but containing alkyl substituted imidazolidone sizing agent. Water absorption was water absorption after immersion of the samples in water for 2 hours. ASTM C473 was followed for MOR/Break Load (flexural peak load), except the specimen supports are spaced 10 inch, instead of 14 inch as specified in the ASTM C473. The samples for MOR were 3 inches wide.

TABLE 4

½ inch LDCB (Low Density Cover Boards)

| Description | Thickness, inches | Density, lbs per cubic foot | Break Load, lbf | Combustibles wt. % | MOR, psi | Water wt. % | 2 hour Water Absorption by % Volume |
|---|---|---|---|---|---|---|---|
| Condition 1 No coating (comparative) | 0.551 | 13.8 | 26.4 | 27.4 | 195.3 | 11.30 | 2.55 |
| Trial # 1 (invention) | 0.505 | 11.9 | 9.9 | 25.1 | 87.1 | 10.60 | 2.02 |
| Trial # 2 (invention) | 0.501 | 14.9 | 15.2 | 26.1 | 136.5 | 9.40 | 2.23 |
| Trial # 3 (invention) | 0.473 | 12.9 | 9.5 | 26.4 | 95.5 | 11.30 | 2.33 |

Example 2

Figure 8:
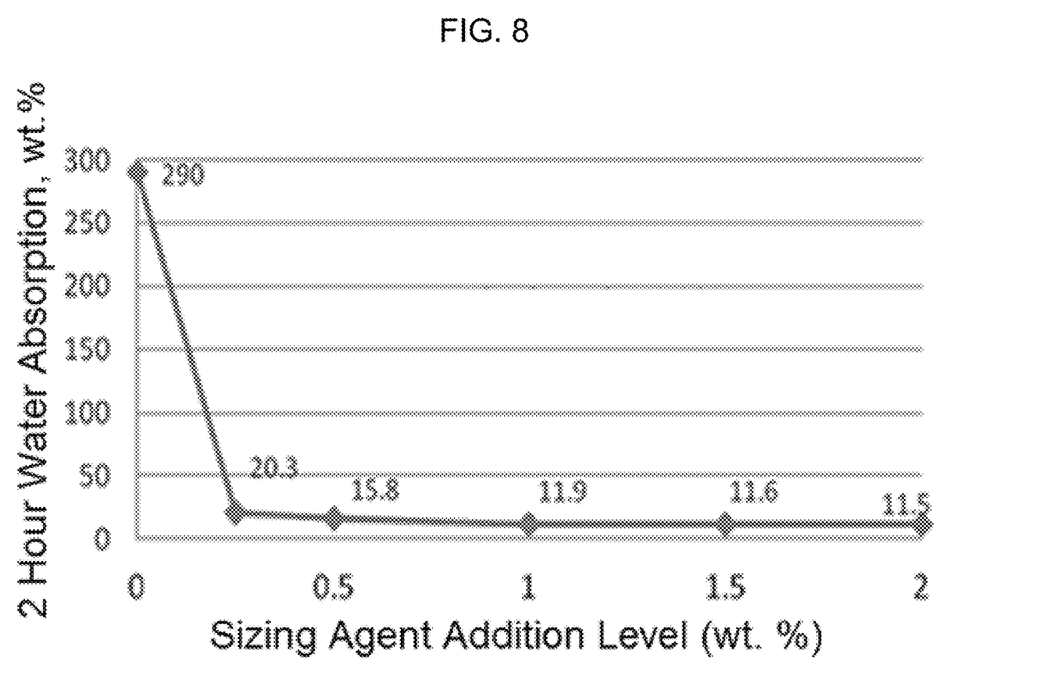
FIG. 8 compares tested TAPPI boards, namely roof board dried base mats lacking sizing agent to roof board dried base mats of the present invention of the same composition but containing alkyl substituted imidazolidone sizing agent.

FIG. 8 compares tested boards, namely roof board dried base mats lacking sizing agent to roof board dried base mats of the present invention of the same composition but containing alkyl substituted imidazolidone sizing agent. FIG. 8 shows alkyl substituted imidazolidone sizing agent is sufficient at an addition level approximately 0.25-0.5%. This addition level is about 1.25-2.5 pounds/MSF (dry). Board was made of Mineral Wool: 18%, Newsprint: 12%, Perlite 60%, and Starch: 10%. The board has a density of about 12-13 pounds per cubic foot.

CLAUSES OF THE INVENTION

The following clauses describe various aspects of the invention:

Clause 1. A composite roofing structure comprising:
a roof cover board that comprises a dried base mat comprising:
about 8 wt % to about 25 wt % mineral wool,
about 40 wt % to about 65 wt % perlite,
about 9 wt % to about 15 wt % binder,
about 9 wt % to about 15 wt % cellulosic fiber, and
about 0.25 wt % to about 2 wt % sizing agent;
a layer of insulation; and
a layer of roofing membrane;
wherein the roof cover board is over the layer of insulation, the roofing membrane is over the roof cover board, the roof cover board is attached to the layer of insulation, and the roofing membrane is attached to the roof cover board.

Clause 2. The composite roofing structure of clause 1, wherein the dried base mat has an absence of boron trioxide, glass fibers, gypsum, wax emulsions, siloxanes, silicone fluids, glass beads, polymer fibers, clay, vermiculite, calcium carbonate, magnesium carbonate, and zinc pyrithione.

Clause 3. The roof composite roofing structure of clause 1 or 2, wherein the dried base mat further comprises a glass mat laminate or a coating on a surface of the dried base mat.

Clause 4. The composite roofing structure of clause 1 or 2 further comprising: an asphalt coating on a surface of the dried base mat.

Clause 5. The composite roofing structure of clause 1 or 2, wherein the dried base mat of the roof cover board has a density of about 10 pounds per cubic foot to about 17 pounds per cubic foot (160 to 272 kg per cubic meter) and a thickness of about ¼ inch to about 1 inch (0.635 to 2.54 cm).

Clause 6. The composite roofing structure of clause 1 or 2, wherein the sizing agents is selected from the group of waxes, polyurethane, siloxanes, silicone fluids, alkyl ketene dimer, alkyl ketene multimer, alkenyl succinic anhydride, alkyl substituted succinic anhydrides, alkyl substituted succinic melamines, alkyl substituted imidazolidones, styrene maleic anhydride, styrene acrylic acid, ethylene acrylic acid, 1,1-octadecoxyoctadecane, the distearyl acetal of stearyl aldehyde, cellulose stearate, calcium stearate, a copolymer of diallylamine and acrylamide, alkyl substituted synthetic imidazolidone, alkaline sizing agents, acid-based sizing agents C6 to C24 unsaturated hydrocarbon compounds, alum and rosin-based sizing agents, alkyl ketene dimer, alkenyl ketene dimer, alkenyl succinic anhydride, carboxyl methyl cellulose, alkyl ketene dimer alkyl succinic anhydride, and mixtures thereof.

Clause 7. The composite roofing structure of clause 6, wherein there is an absence of polyurethane, polyiscyanurate, siloxanes and silicone fluid.

Clause 8. The composite roofing structure of clause 1 or 2, wherein the dried base mat of the roof cover board has a density of about 15 pcf to about 17 pcf (240 to 272 kg per cubic meter).

Clause 9. A composite roofing structure comprising:
a roof cover board that comprises a dried base mat comprising:
about 30 wt % to about 70 wt % mineral wool,
about 10 wt % to about 50 wt % perlite,
about 5 wt % to about 15 wt % binder,
about 2 wt % to about 20 wt % cellulosic fiber, and
about 0.25 wt % to about 2 wt % sizing agent;
a layer of insulation; and
a layer of roofing membrane;
wherein the roof cover board is over the layer of insulation, the roofing membrane is over the roof cover board, the roof cover board is attached to the layer of insulation, and the roofing membrane is attached to the roof cover board.

Clause 10. The composite roofing structure of clause 9, wherein the dried base mat has an absence of boron trioxide, glass fibers, gypsum, wax emulsions, siloxanes, silicone fluids, glass beads, polymer fibers, clay, vermiculite, calcium carbonate, magnesium carbonate, and zinc pyrithione.

Clause 11. The composite roofing structure of clause 9 or 10, wherein the dried base mat further comprises: a glass mat laminate or a coating on a surface of the dried base mat.

Clause 12. The composite roofing structure of clause 9 or 10, wherein the dried base mat further comprises: an asphalt coating on a surface of the dried base mat.

Clause 13. The composite roofing structure of clause 9 or 10, wherein the dried base mat of the roof cover board has a density of about 10 pcf to about 17 pcf (160 to 272 kg per cubic meter) and a thickness of about ¼ inch to about 1 inch (0.635 to 2.54 cm).

Clause 14. The composite roofing structure of clause 8 or 9, wherein the sizing agents is selected from the group of waxes, polyurethane, siloxanes, silicone fluids, alkyl ketene dimer, alkyl ketene multimer, alkenyl succinic anhydride, alkyl substituted succinic anhydrides, alkyl substituted succinic melamines, alkyl substituted imidazolidones, styrene maleic anhydride, styrene acrylic acid, ethylene acrylic acid, 1,1-octadecoxyoctadecane, the distearyl acetal of stearyl aldehyde, cellulose stearate, calcium stearate, a copolymer of diallylamine and acrylamide, alkyl substituted synthetic imidazolidone, alkaline sizing agents, acid-based sizing agents C6 to C24 unsaturated hydrocarbon compounds, alum and rosin-based sizing agents, alkyl ketene dimer, alkenyl ketene dimer, alkenyl succinic anhydride, carboxyl methyl cellulose, alkyl ketene dimer alkyl succinic anhydride, and mixtures thereof.

Clause 15. The composite roofing structure of clause 1 or 2, wherein the dried base mat of the roof cover board has a density of about 15 pcf to about 17 pcf (240 to 272 kg per cubic meter).

Clause 16. A composite roofing structure comprising:
a roof cover board that comprises a dried base mat comprising:
about 60 wt % to about 90 wt % mineral wool,
0 wt % to about 10 wt % glass fiber,
0 wt % to about 10 wt % perlite,
about 4 wt % to about 10 wt % binder,
0 wt % to about 5 wt % gypsum, and
about 0.25 wt % to about 2 wt % sizing agent;
a layer of insulation; and
a layer of roofing membrane;
wherein the roof cover board is over the layer of insulation, the roofing membrane is over the roof cover board, the roof cover board is attached to the layer of insulation, and the roofing membrane is attached to the roof cover board.

Clause 17. The composite roofing structure of clause 16, wherein the roof cover board has an absence of boron trioxide, cellulosic fibers, wax emulsions, siloxanes, silicone fluids, glass beads, polymer fibers, clay, vermiculite, calcium carbonate, magnesium carbonate, and zinc pyrithione.

Clause 18. The composite roofing structure of clause 16 or 17, wherein the roof cover board has an absence of at least one of: cellulosic fibers, boron trioxide, glass fiber, perlite, or gypsum.

Clause 19. The composite roofing structure of clause 16 or 17, wherein the dried base mat further comprises: a glass mat laminate or a coating on a surface of the dried base mat.

Clause 20. The composite roofing structure of clause 16 or 17, wherein the dried base mat further comprises: an asphalt coating on a surface of the dried base mat.

Clause 21. The composite roofing structure of clause 16 or 17, wherein the dried base mat of the roof cover board has a density of about 10 pcf to about 17 pcf and a thickness of about ¼ inch to about 1 inch (0.635 to 2.54 cm), wherein the roof cover board has an absence of at least one of cellulosic fibers.

Clause 22. The composite roofing structure of clause 16 or 17, wherein the sizing agents is selected from the group of waxes, polyurethane, siloxanes, silicone fluids, alkyl ketene dimer, alkyl ketene multimer, alkenyl succinic anhydride, alkyl substituted succinic anhydrides, alkyl substituted succinic melamines, alkyl substituted imidazolidones, styrene maleic anhydride, styrene acrylic acid, ethylene acrylic acid, 1,1-octadecoxyoctadecane, the distearyl acetal of stearyl aldehyde, cellulose stearate, calcium stearate, a copolymer of diallylamine and acrylamide, alkyl substituted synthetic imidazolidone, alkaline sizing agents, acid-based sizing agents C6 to C24 unsaturated hydrocarbon compounds, alum and rosin-based sizing agents, alkyl ketene dimer, alkenyl ketene dimer, alkenyl succinic anhydride, carboxyl methyl cellulose, alkyl ketene dimer alkyl succinic anhydride, and mixtures thereof.

While particular versions of the invention have been shown and described, it will be appreciated by those skilled in the art that changes and modifications may be made thereto without departing from the invention in its broader aspects and as set forth in the following claims.

What is claimed is:

1. A composite roofing structure comprising:
    a roof cover board that comprises a dried base mat comprising:
        about 8 wt % to about 25 wt % mineral wool,
        about 40 wt % to about 65 wt % perlite,
        9 wt % to 15 wt % starch binder and/or latex binder,
        about 9 wt % to about 15 wt % cellulosic fiber, and
        0.25 wt % to 2.0 wt % sizing agent,
        wherein the dried base mat has an absence of bituminous material;
    a layer of insulation; and
    a layer of waterproof roofing membrane;
    wherein the roof cover board is over the layer of insulation, the roofing membrane is over the roof cover board, the roof cover board is attached to the layer of insulation, and the waterproof roofing membrane is attached to the roof cover board.

2. The composite roofing structure of claim 1, wherein the dried base mat has an absence of boron trioxide, glass fibers, gypsum, wax emulsions, siloxanes, silicone fluids, glass beads, polymer fibers, clay, vermiculite, calcium carbonate, magnesium carbonate, and zinc pyrithione, wherein the waterproof roofing membrane has an absence of fiberglass, wherein the waterproof roofing membrane is made of ethylene propylene diene monomer (EPDM) rubber, thermoplastic polyolefins (TPO), or polyvinyl chloride (PVC).

3. The roof composite roofing structure of claim 1, wherein the dried base mat further comprises a glass mat laminate or a coating on a surface of the dried base mat, wherein there is 9 wt % to 15 wt % starch binder in the dried base mat or there is 9 wt % to 15 wt % latex binder in the dried base mat.

4. The composite rooting structure of claim 1 wherein the dried base mat consists of:
    about 8 wt % to about 25 wt % mineral wool,
    about 40 wt % to about 65 wt % perlite,
    9 wt % to 15 wt % starch binder and/or latex binder,
    about 9 wt % to about 15 wt % cellulosic fiber, and
    0.25 wt % to 2 wt % sizing agent.

5. The composite roofing structure of claim 1, wherein the dried base mat of the roof cover board has a density of about 10 pounds per cubic foot to about 17 pounds per cubic foot (160 to 272 kg per cubic meter) and a thickness of about ¼ inch to about 1 inch (0.635 to 2.54 cm), wherein the dried base mat of the roof cover board has 0.25 wt % to 1.0 wt % said sizing agent.

6. The composite roofing structure of claim 1, wherein the sizing agents is selected from the group of waxes, polyurethane polyurethane distributed to not form a cellular structure, siloxanes, silicone fluids, alkyl ketene dimer, alkyl ketene multimer, alkyl substituted succinic melamines, alkyl substituted imidazolidones, styrene maleic anhydride, styrene acrylic acid, ethylene acrylic acid, 1,1-octadecoxyoctadecane, the distearyl acetal of stearyl aldehyde, cellulose stearate, calcium stearate, a copolymer of diallylamine and acrylamide, alkyl substituted synthetic imidazolidone, alkaline sizing agents, acid-based sizing agents C6 to C24 unsaturated hydrocarbon compounds, alum and rosin-based sizing agents, alkyl ketene dimer, alkenyl ketene dimer, carboxyl methyl cellulose, and mixtures thereof.

7. The composite roofing structure of claim 6, wherein there is an absence of polyurethane, polyisocyanurate, siloxanes and silicone fluid.

8. The composite roofing structure of claim 1, wherein there is 9 wt % to 13 wt % cellulosic fiber in the dried base mat of the roof cover board.

9. A composite roofing structure comprising:
    a roof cover board that comprises a dried base mat comprising:
        about 30 wt % to about 70 wt % mineral wool,
        about 10 wt % to about 50 wt % perlite,
        6.5 wt % to 15 wt % starch binder and/or latex binder,
        about 2 wt % to about 20 wt % cellulosic fiber, and
        0.25 wt % to 2.0 wt % sizing agent,
        wherein the dried base mat has an absence of bituminous material;
    a layer of insulation; and
    a layer of waterproof roofing membrane;
    wherein the roof cover board is over the layer of insulation, the roofing membrane is over the roof cover board, the roof cover board is attached to the layer of insulation, and the roofing membrane is attached to the roof cover board.

10. The composite roofing structure of claim 9, wherein the dried base mat has an absence of boron trioxide, glass fibers, gypsum, wax emulsions, siloxanes, silicone fluids, glass beads, polymer fibers, clay, vermiculite, calcium carbonate, magnesium carbonate, and zinc pyrithione, wherein the waterproof roofing membrane has an absence of fiberglass, and wherein the waterproof roofing membrane is made of ethylene propylene diene monomer (EPDM) rubber, thermoplastic polyolefins (TPO), or polyvinyl chloride (PVC).

11. The composite roofing structure of claim 9, wherein the dried base mat further comprises: a glass mat laminate or a coating on a surface of the dried base mat, wherein there is 6.5 wt % to 15 wt % starch binder in the dried base mat or there is 6.5 wt % to 15 wt % latex binder in the dried base mat.

12. The composite roofing structure of claim 9, wherein the dried base mat further comprises: an asphalt coating on a surface of the dried base mat, wherein there is 6.5 wt % to 15 wt % starch binder in the dried base mat.

13. The composite roofing structure of claim 9, wherein the dried base mat of the roof cover board has a density of about 10 pcf to about 17 pcf (160 to 272 kg per cubic meter) and a thickness of about ¼ inch to about 1 inch (0.635 to 2.54 cm) wherein the dried base mat of the roof cover board has 0.25 wt % to 1.0 wt % said sizing agent.

14. The composite roofing structure of claim 8, wherein the sizing agents is selected from the group of waxes, polyurethane distributed to not form a cellular structure, siloxanes, silicone fluids, alkyl ketene dimer, alkyl ketene multimer, alkyl substituted succinic melamines, alkyl substituted imidazolidones, styrene maleic anhydride, styrene acrylic acid, ethylene acrylic acid, 1,1-octadecoxyoctadecane, the distearyl acetal of stearyl aldehyde, cellulose stearate, calcium stearate, a copolymer of diallylamine and acrylamide, alkyl substituted synthetic imidazolidone, alkaline sizing agents, acid-based sizing agents C6 to C24 unsaturated hydrocarbon compounds, alum and rosin-based. sizing agents, alkyl ketene dimer, alkenyl ketene dimer, carboxyl methyl cellulose, and mixtures thereof.

15. A composite roofing structure comprising:
a roof cover board that comprises a dried base mat comprising:
about 60 wt % to about 90 wt % mineral wool,
0 wt % to about 10 wt % glass fiber,
0 wt % to about 10 wt % perlite,
5 wt % to 10 wt % starch binder and/or latex binder,
0 wt % to about 5 wt % gypsum, and
0.25 wt % to 2.0 wt % sizing agent,
wherein the dried base mat has an absence of bituminous material;
a layer of insulation; and
a layer of waterproof roofing membrane;
wherein the roof cover board is over the layer of insulation, the roofing membrane is over the roof cover board, the roof cover board is attached to the layer of insulation, and the roofing membrane is attached to the roof cover board.

16. The composite roofing structure of claim 15, wherein the roof cover board has an absence of boron trioxide, cellulosic fibers, wax emulsions, siloxanes, silicone fluids, glass beads, polymer fibers, clay, vermiculite, calcium carbonate, magnesium carbonate, and zinc pyrithione, wherein the waterproof roofing membrane has an absence of fiberglass, and wherein the waterproof roofing membrane is made of ethylene propylene diene monomer (EPDM) rubber, thermoplastic polyolefins (TPO), or polyvinyl chloride (PVC).

17. The composite roofing structure of claim 15, wherein the roof cover board has an absence of at least one of: cellulosic fibers, boron trioxide, glass fiber, perlite, or gypsum, wherein there is 5 wt % to 8 wt % starch binder in the dried base mat or there is 5 wt % to 8 wt % latex binder in the dried base mat.

18. The composite roofing structure of claim 15, wherein the dried base mat further comprises: a Mass mat laminate or a coating on a surface of the dried base mat, wherein there is 5 wt % to 8 wt % starch binder in the dried base mat.

19. The composite rooting structure of claim 15, wherein the dried base mat of the roof cover board has a density of about 10 pcf to about 17 pcf and a thickness of about ¼ inch to about 1 inch (0.635 to 2.54 cm), wherein the roof cover board has an absence of at least one of cellulosic fibers, wherein the dried base mat of the roof cover board has 0.25 wt % to 1.0 wt % said sizing agent.

20. The composite roofing structure of claim 15, wherein the sizing agents is selected from the group of waxes, polyurethane distributed to not form a cellular structure, alkyl ketene dimer, alkyl ketene multimer, alkyl substituted succinic melamines, alkyl substituted imidazolidones, styrene maleic anhydride, styrene acrylic acid, ethylene acrylic acid, 1,1-octadecoxyoctadecane, the distearyl acetal of stearyl aldehyde, cellulose stearate, calcium stearate, a copolymer of diallylamine and acrylamide, alkyl substituted synthetic imidazolidone, alkaline sizing agents, acid-based sizing agents C6 to C24 unsaturated hydrocarbon compounds, alum and rosin-based sizing agents, alkyl ketene dimer, alkenyl ketene dimer, carboxyl methyl cellulose, and mixtures thereof.

* * * * *